Aug. 2, 1966        A. M. PENTLAND        3,263,474
METHOD AND APPARATUS FOR FORMING SPLINES
Filed Dec. 14, 1962        2 Sheets-Sheet 1
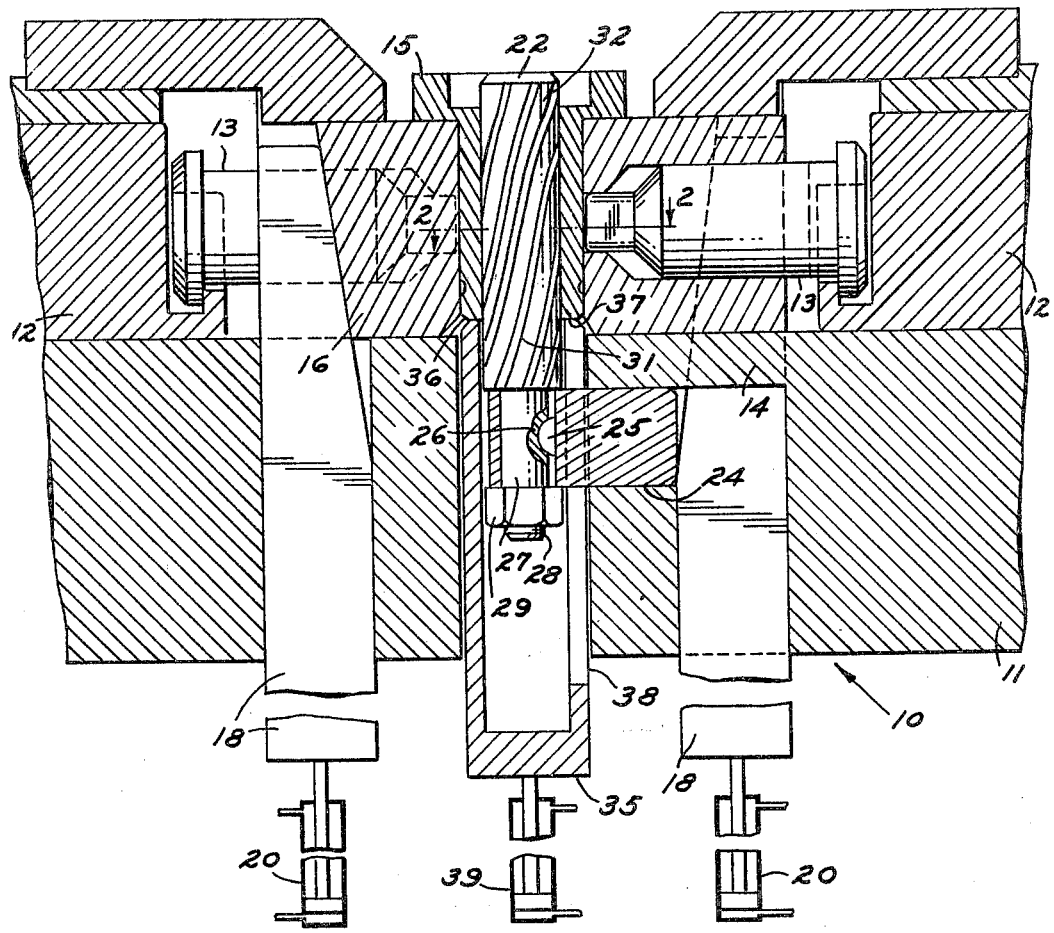
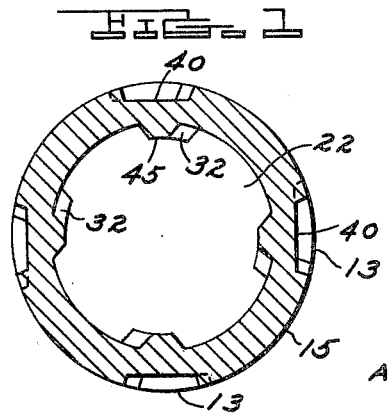
ALEX M. PENTLAND
INVENTOR.
BY John R. Faulkner
Stuart Lubitz
ATTORNEYS Aug. 2, 1966   A. M. PENTLAND   3,263,474
METHOD AND APPARATUS FOR FORMING SPLINES
Filed Dec. 14, 1962   2 Sheets-Sheet 2
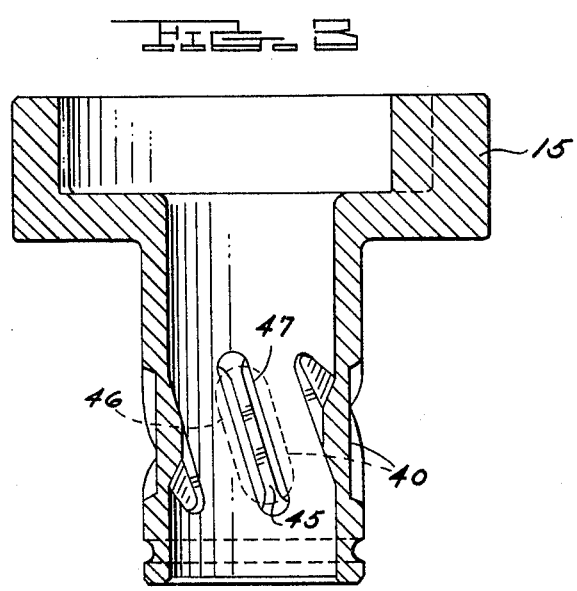
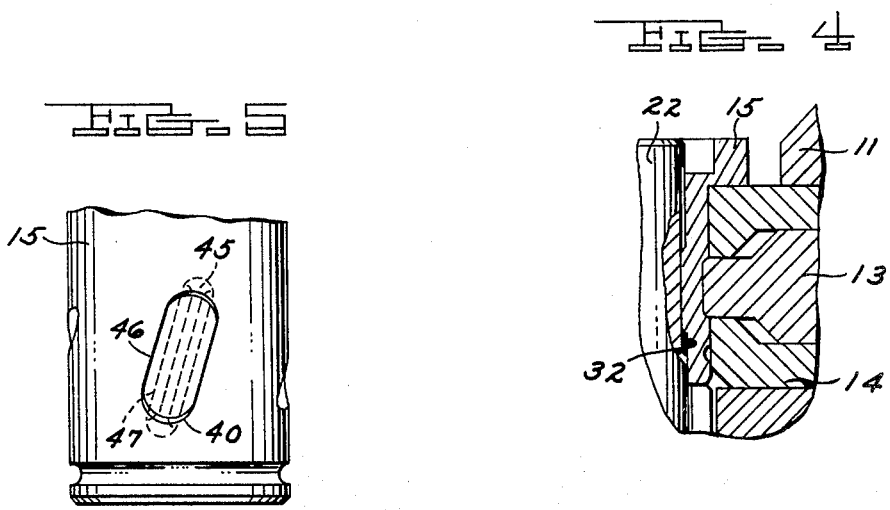
ALEX M. PENTLAND
INVENTOR.
BY John R. Faulkner
Stuart Lubitz
ATTORNEYS United States Patent Office 3,263,474
Patented August 2, 1966

3,263,474
METHOD AND APPARATUS FOR
FORMING SPLINES
Alex M. Pentland, Ann Arbor, Mich., assignor to Ford
Motor Company, Dearborn, Mich., a corporation of
Delaware
Filed Dec. 14, 1962, Ser. No. 244,607
2 Claims. (Cl. 72—370)

This invention relates to a method and apparatus for forming splines. More particularly, the invention relates to the forming of an internal spline on the barrel of the starting motor of an automotive vehicle.

In the past it has been a common practice to form internal splines by press forming. The use of a press forming operation will generally result in a shallow internal spline having a substantial width and a uniform wall thickness. When forming internal splines on a tubular member having a relatively small outside diameter, for example, an inch or less, the substantial width of the press formed spline will limit the number of adjacent internal splines that may be formed around the circumferential surface. This limitation on the number of splines around a circumferential surface and the contour of these splines minimizes design flexibility. Further, when the internal splines are press formed, it is necessary that the mating surfaces of the external spline be formed by a hobbing or similar machine operation in order to obtain a proper meshing relationship. This is because the distance that must exist between the adjacent external splines when mating with a broad press formed internal spline necessitates metal flow that is beyond the practical capability of commonly used rolling machines and materials.

The instant invention utilizes a cold extruding operation to form the internal splines. A tubular member or barrel blank is placed on a hardened steel die or mandrel having a plurality of external splines and spaces corresponding to the internal splines desired in the finished starting motor barrel. An external die or collet is closed tightly around the tubular section to be splined. Punches then apply pressure externally to the barrel blank and cause the metal to flow inwardly into the spaces between the external splines on the mandrel. The punches are removed, the collet opened and the mandrel is then withdrawn from the barrel as either the barrel or mandrel is moved axially. This method of manufacturing internal splines permits a plurality of splines having an accurately controlled shape and a relatively narrow width to be formed in any axial position around a relatively small circumferential surface. The external distortion of the formed spline is limited to such an extent that subsequent machining is not required. The narrow width spline allows a mating surface or an external spline on a shaft to be formed by a low-cost, high productivity rolling operation.

It is the general object of the instant invention to provide an improved method of manufacturing splines.

Another object of the invention is the provision of a method and apparatus for forming a plurality of internal splines simultaneously.

Another object of the invention is the provision of a method and apparatus for forming internal splines by an extrusion process.

Another object of this invention is the provision of a method and apparatus for forming internal splines that may be utilized in conjunction with a mating surface formed by a rolling operation.

Another object of this invention is the provision of a method and apparatus for forming splines having a helical shape.

Other objects and advantages of the instant invention will become obvious when the written specification is considered with the drawings wherein:

FIGURE 1 is a sectional view of a portion of a machine utilized to form the internal splines;
FIGURE 2 is a sectional view taken along the lines 2—2 of FIGURE 1;
FIGURE 3 is a sectional view of the finished starter motor drive barrel;
FIGURE 4 is an enlarged sectional view of a part of the apparatus shown in FIGURE 1; and
FIGURE 5 is an elevation view of the exterior of a part of the starter motor drive barrel.

Referring to FIGURE 1, the tool 10 utilized to form the internal splines includes a base or frame 11. The base 11 slidably houses a plurality of rams 12 that are connected to and operated by hydraulic cylinders (not shown). The rams 12 carry and actuate carbide or high speed steel punches 13 which are slidably mounted in the collet segment 14. The rams 12 and punches 13 are radially spaced around the hollowed blank or starter motor barrel 15 and they may be actuated simultaneously so that each punch exerts a maximum force of 20 tons on the surface of the blank 15. The force exerted on the blank 15 is, of course, dependent on the punch area and the material being formed. In forming an internal spline a fixed load is applied by the punch 13 while its length of travel may vary to a limit controlled by stops (not shown) which protect mandrel 22 in case barrel 15 is missing.

The collet 14 is made up of several segments and has cam operated portions 16 that are slidably actuated by the cams 18 which are slidably mounted in the frame 11 and which are connected to the hydraulic cylinders 20. Typically, the hydraulic cylinders 20 have a maximum stroke of ½ inch and exert a maximum force of four tons. The hydraulic cylinders 20 cooperate with the cams 18 causing the portions 16 to move, for example, 0.020 inch and thus surround and hold the blank 15.

The blank 15 is inserted onto a carbide or high speed steel die or mandrel 22 which is located in the tool frame 11 by a guide ring 24. The guide ring 24 has a key 25 that mates with a slot or key way 26 in a downwardly extending shaft portion 27 of the die 22. The shaft portion 27 has a threaded end 28 which receives a nut 29. The nut 29 abuts the guide ring 24 thus fixing the location of the die or mandrel 22. The die or mandrel 22 has a series of external splines 31 formed upon its surface. These splines are separated by a plurality of spaces 32 and, typically, they may take the form of a helical spline having one revolution in six inches. The spacing and configuration of the die or mandrel 22 will depend upon the dimensions and shape of the splines being formed. The splines 31 are dimensioned so that their largest diameter is virtually in contact with the interior of the blank 15. An enlarged view of the cooperation between the punch 13, collet 14, blank 15 and die or mandrel 22 is shown in FIGURE 4.

A stripper 35 is slidably mounted in the tool frame 11 and abuts the bottom portion 36 of the blank 15. The stripper 35 has an opening 38 which permits it to slide over the key 25 of guide ring 24. A hydraulic cylinder 39 is connected to the stripper 35 and when actuated causes the stripper to move in an upward direction, thereby causing the blank 15 to rotate and move in an upward direction. It should be noted that the bottom portion 36 of the blank 15 may rotatably slide on the surface 37 of the stripper 35.

In summary the blank 15 is inserted onto the die or mandrel 22 and the hydraulic cylinders 20 are actuated to cause the collet 14 to close and hold the blank 15.

The hydraulic cylinders which are attached to the ram 12 are then actuated causing the punch 13 to exert a pressure on the blank 15. This pressure extrudes the blank 15 into the spaces 32 of the die 22. When the splines on the blank 15 are formed, the punch 13 and the cams 18 are retracted by the associated hydraulic cylinders and the blank 15 is then removed by the movement of the stripper 35 which is actuated by the hydraulic cylinder 39. After the blank is removed, the stripper 35 is retracted and the tool is ready for another operation. It should be understood that the tool described above is only exemplary and is one of many devices that could be used to extrude the internal spline.

The method of forming the internal spline involves a number of steps which could be performed by many instrumentalities. The method involves the steps of inserting a die into the hollowed portion of a blank such as the blank used for forming a starter motor barrel, causing a pressure to be exerted on the exterior of this barrel of such a magnitude that the barrel is extruded into the die and then removing or separating the die from the finished motor starter barrel.

In performing this method, it has been generally found that the pressure exerted on the blank must be exerted over an area greater in width than the width of the spline to be formed. This relationship is clearly shown in FIGURES 2, 3 and 4. The width of the area over which the punch acts is designated as 40 while the width of the formed spline is designated as 45. It should also be noted that the length 46 of the area over which the punch exerts its pressure approaches the length of the finished internal spline 47.

It will be understood that the invention is not to be limited to the exact construction shown and described and that various changes and modifications may be made without departing from the spirit and scope of the invention, as defined in the appended claims.

I claim:
1. The process of forming an internal spline in a hollow deformable blank comprising bringing the internal diameter of the hollow blank to the required final interior diameter, inserting a die into the hollowed portion of said blank without altering the interior diameter, said die having a configuration conforming to the desired internal spline and a diameter essentially the same as the interior diameter of the hollow blank, and causing a pressure to be exerted on the exterior of said blank over an area greater in width than the width of the spline to be formed, said pressure being of such magnitude that the blank is extruded into the die and the internal spline is given its final shape in a single extrusion step, the formation of the spline taking place while the blank is stationary.

2. The process of forming an internal spline in a deformable motor starter barrel comprising bringing the internal diameter of the motor starter barrel to the required final interior diameter, inserting a die into the motor starter barrel without altering the interior diameter, said die having a configuration conforming to the desired internal spline and a diameter essentially the same as the internal diameter of the starter barrel, and causing a pressure to be exerted on the exterior of said starter barrel over an area greater in width than the spline to be formed, said pressure being of such magnitude that the barrel is extruded into the die and the internal spline is given its final shape in a single extrusion step, the formation of the spline taking place while the barrel is stationary.

References Cited by the Examiner
UNITED STATES PATENTS

| | | | |
|---|---|---|---|
| 1,819,376 | 8/1931 | Muller | 72—76 |
| 2,852,835 | 9/1958 | Harvey et al. | 29—1.1 |
| 2,947,081 | 8/1960 | Clevenger | 72—370 |

CHARLES W. LANHAM, *Primary Examiner.*

L. A. LARSON, *Assistant Examiner.*